Patented June 16, 1953

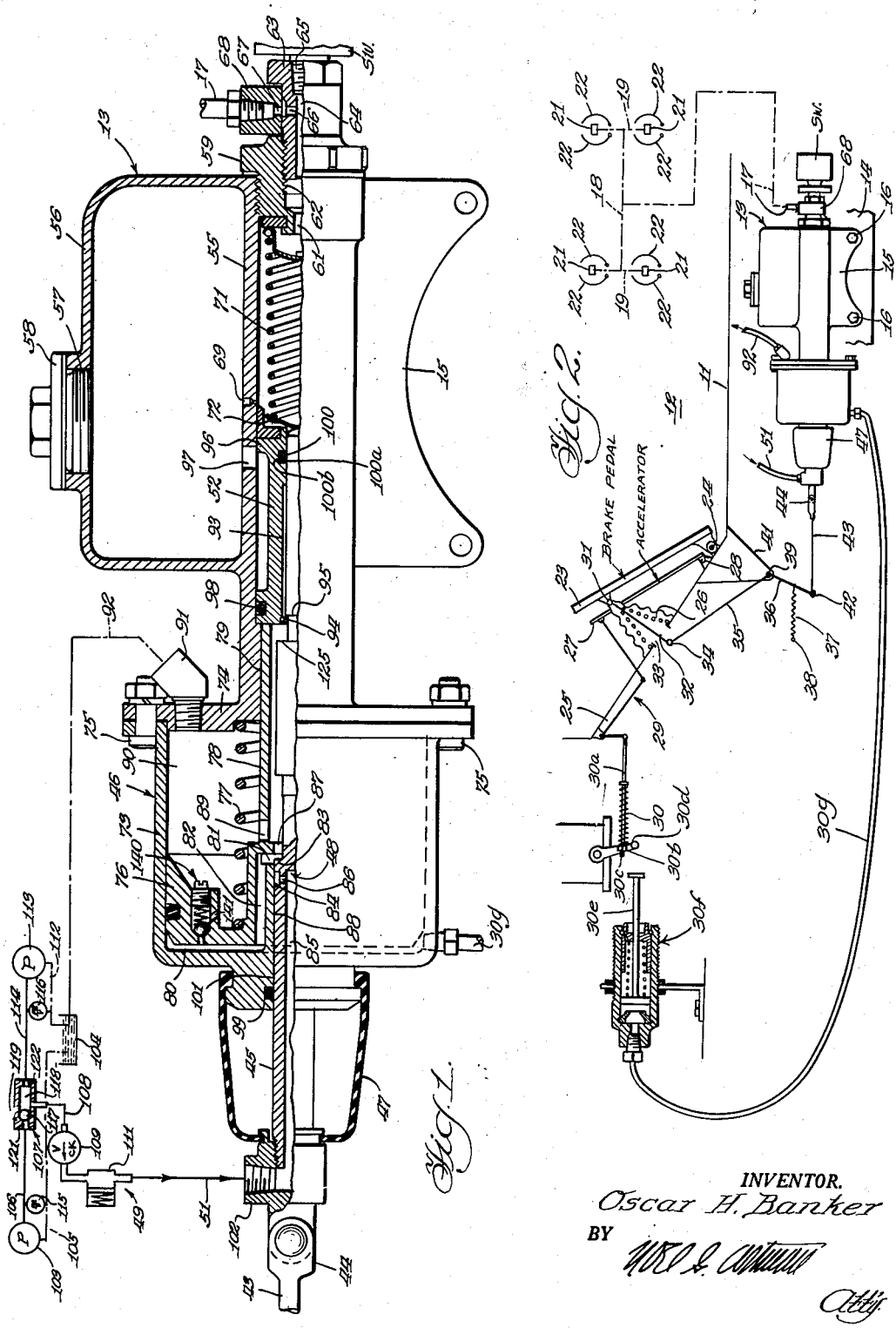

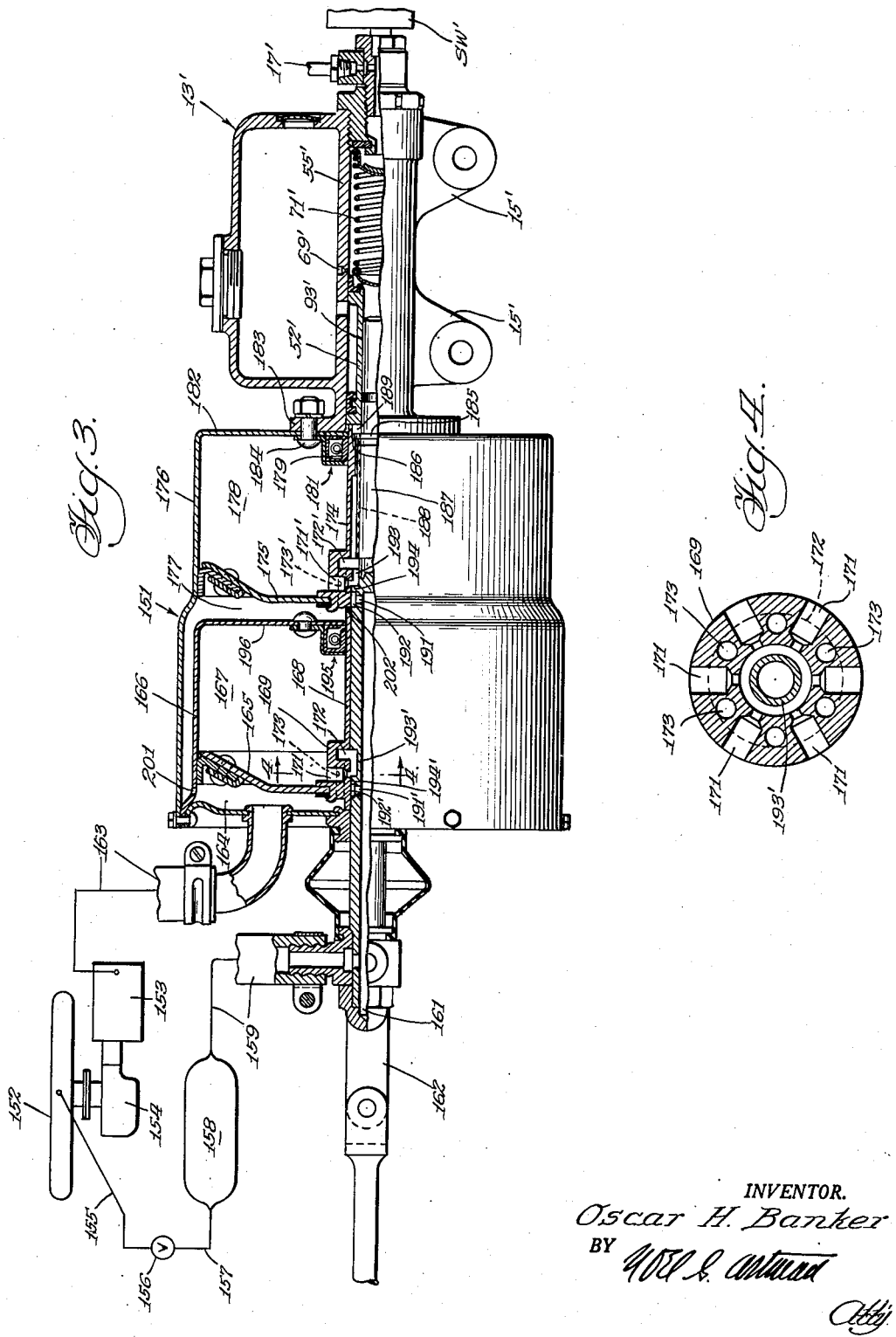

2,642,165

UNITED STATES PATENT OFFICE 2,642,165

PEDALLY CONTROLLED POWER-OPERATED VEHICLE BRAKE APPLYING APPARATUS

Oscar H. Banker, Evanston, Ill., assignor to New Products Corporation, Chicago, Ill., a corporation of Delaware Application July 8, 1949, Serial No. 103,575

10 Claims. (Cl. 192—3)

This invention has to do with a manually controlled power applied braking apparatus and relates more particularly to a hydraulic braking system wherein there is a pressure booster unit manually controlled for operating the master cylinder of the apparatus.

An important object of this invention is the provision of an improved hydraulic braking system wherein the power for applying the brakes is derived through a fluid pressure source and controlled manually by a foot operated pedal normally having a small range of movement adapting this pedal to be disposed beside the conventional accelerator pedal to facilitate easy and quick shifting of the operator's foot onto the brake pedal.

Another object is the provision of an improved braking system employing a hydraulic pressure booster which exerts the principal operating force upon the plunger of a master cylinder together with means opposing braking applying advancement of the manually operated pedal with a diminutive force having a magnitude correlated with the pressure in the fluid column between the master cylinder plunger and the brake applying pulsators.

Still another object is the provision of an improved hydraulic braking system of the power type wherein a source of pressure fluid for operating the brakes is maintained under pressure by either an engine driven pump or a vehicle driven pump should the other of such pumps be quiescent; and the invention further contemplates provision of a hydraulic accumulator as a component of the pressure fluid source so that fluid can be stored under pressure for operating the brakes in the event of failure or quiescence of both pumps.

Another object is the provision in a power operated hydraulic braking system of coaxially arranged pressure booster and master cylinder units together with a valve and an operating rod therefor disposed coaxially of these units for controlling admittance of operating fluid to the pressure booster unit and said rod having a shoulder which contacts the master cylinder plunger for compression of the fluid column leading to the brake pulsators incident to manual depression of the brake pedal should the brake booster be inoperative.

Another object is the provision of a power operated hydraulic braking system according to the next preceding object wherein said manually operated valve controlling rod when advanced for manually applying the braking pressure is advanced independently of the pressure booster unit and therefor without hindrance therefrom.

Another object of the invention is the provision of a hydraulic booster system and valving mechanism wherein hydraulic fluid circulates only during increase of braking power, thus having the advantage of not dissipating fluid from a pump circuit which continues to serve other functions and avoiding replacement of such pump by a larger one even though further loaded by this additional system and mechanism.

Another object is the provision of an improved pressure booster hydraulic circuit wherein an exhaust communication with a pulsator chamber of the booster is immersed in a body of the circuit-contained liquid to assure exclusion of air from such chamber.

These and other desirable objects inherent in and encompassed by the invention will be more readily apparent from the ensuing description, the appended claims and the annexed drawings, wherein:

Fig. 1 is a side elevational view partly in longitudinal section of a pressure booster and master cylinder assembled and arranged in accordance with this invention, together with a diagrammatically represented fluid pressure source.

Fig. 2 is a side elevational view of the pressure booster and master cylinder units of Fig. 1 shown below a diagrammatically illustrated vehicle driver's compartment and diagrammatically illustrated mechanical and hydraulic connections with these units.

Fig. 3 is a view taken similarly to Fig. 1 illustrating a modified embodiment wherein the pressure booster unit is adapted for energization when subjected to sub-atmospheric air pressure having its source at the intake manifold of the vehicle engine.

Fig. 4 is a sectional view of the enlarged end portion 169 taken on the line 4—4 of Fig. 3.

A general idea of the purposes and operation of the apparatus can be obtained by referring to Fig. 2. Beneath a floor board 11 of a driver's compartment 12 there is mounted a substantially conventional master cylinder unit 13 upon a part 14 of the vehicle frame by means of a bracket 15, formed integrally with the casing of such unit, and bolts 16 passing through this bracket into anchored relation with the frame part. A conduit 17 represented partly diagrammatically by a dot-dash line communicates between the master cylinder unit 13 and branch conduits 18 and 19 connected with fluid operated pulsators 21 for operating diagrammatically represented brake shoes 22 of the vehicle brakes.

A brake pedal 23 for controlling the master cylinder unit 13 is pivotally mounted at 24 upon a lower portion of an inclined floor board 25 in the forward part of the driver's compartment. This brake pedal is urged into the released position shown in Fig. 2 by a conical helical spring 26, and when in this position occupies a plane in contiguous parallelism with the plane occupied by the vehicle accelerator control pedal 27 which is pivotally mounted on the floor board 25 at 28 and is connected with the vehicle throttle by a linkage 29 which may be conventional. A spring 30 about a rod 30a of the linkage normally holds a slider collar 30b against a stop pin 30c so the operating lever 30d of the engine throttle (carburetor) is adjusted in accordance with endwise movement of the rod. However, the spring is compressible to accommodate counter-clockwise pivoting of the lever to the closed-throttle position by the plunger 30e of a hydraulic ram 30f when this ram is energized though the rod 30a remains advanced to the left. The ram 30f is energizable by fluid under pressure received through a conduit 30g from a chamber 80 in a pressure booster unit 46.

Brake pedal 23 is pivotally connected at 31 with a thrust link 32 which extends downwardly through an opening 33 in the floor board 25 into pivotal connection at 34 with the upper end of a bell crank arm 35. A downwardly extending arm 36 of this bell crank has a spring 37 attached thereto and also anchored to a stationary part 38 of the vehicle for urging the bell crank 35—36 to pivot clockwise about a pivotal mounting 39 therefor in a floor-board mounting bracket 41. The lower end of the bell crank arm 36 is pivotally connected at 42 with the forward end of a thrust link 43 which has a pivotal connection 44 at its rear end with an axially movable elongated valve operating element 45 which projects into the pressure booster unit 46. A flexible dust guard 47 offers no substantial resistance to axial movement of the valve operating element 45.

Incident to depression of the brake pedal 23 counter-clockwise about its pivot 24 counter-clockwise movement will be imparted to the bell crank 35—36 about its pivot 39 for moving the thrust link 43 and the valve operating element 45 rearwardly (to the right as viewed in Fig. 2) for opening a control valve generally designated 48 in Fig. 1. When the valve 48 is opened, fluid from the pressure fluid source generally designated 49 in Fig. 1 is communicative through a conduit 51 and said valve 48 with the interior of the pressure booster 46 for causing this pressure booster to exert mechanically applied force to a plunger 52 (Fig. 1) of the master cylinder to compress a liquid column in the conduit 17 for applying the vehicle brakes. The quantity of fluid allowed to enter the pressure booster 46 through the conduit 51 from the pressure fluid source is determined by the amount of depression of the brake pedal 23 and consequently the distance the brake pedal is depressed determines the firmness with which the brakes are applied. No fluid can be dissipated from the source 49 excepting the metered quantity when the valve 48 is open. Inasmuch as the force necessarily applied to the brake pedal 23 is primarily a controlling force for controlling the valve 48 a relatively small manual effort is required for depressing the brake pedal. When the brake pedal is released the springs 37 and 26 will cause it to be returned to the position illustrated in Fig. 2.

Details of a typical master cylinder structure are shown in connection with the master cylinder 13 in Fig. 1. This structure 13 embodies a cylinder proper 55 superposed by a reservoir 56 having a filler opening 57 closed by a removable plug 58. The outer end of the cylinder 55 has a coupling element 59 threaded thereonto. This coupling element contains a central bore 61 of which a portion is threaded at 62 for receiving a fitting 63 having a bore 64 communicating at its outer end with a threaded stem 65 of a fluid pressure operated switch SW for controlling the vehicle brake signal lights (not shown). A lateral passage 66 leading from the bore 64 communicates with an annular passage 67 of a conduit coupling 68. The conduit 17 communicates with the annular passage 67 and leads from the coupling 68 to the brake actuating pulsators 21 as illustrated in Fig. 2.

Brake fluid (not shown) in the reservoir 56 feeds downwardly through a replenishing port 69 in front of the plunger 52 when this plunger is retracted into the brake releasing position shown by a spring 71 reacting between the fitting 59 and a spring retainer cap 72 which bears against the plunger 52.

In a conventional vehicle installation of the master cylinder 13 a linkage from the brake pedal in the operator's compartment is directly connected with the plunger 52 so that when the pedal is depressed the plunger 52 will be forced rearwardly or to the right as viewed in Fig. 1, by direct manual effort. When this occurs the plunger will compress the fluid column in the cylinder 55, bores 61 and 64, lateral 66, groove 67, and the conduits 17, 18 and 19 to actuate the brake applying pulsators, 21. In the present installation however pressure developed by the pressure booster 46 under manual control of the brake pedal 23 is employed for advancing the master pedal plunger 52 into the brake applying position.

The pressure booster or pulsator 46 comprises a large diameter cylinder 73 of which an end wall 74 is formed integrally with the cylinder 55 and reservoir 56 of the master cylinder unit. A ring of bolts 75 secures the end wall 74 to the cylinder 73. A piston 76 reciprocal in the cylinder 73 is urged into the axially retracted position shown by a helical spring 77. A tubular stem 78 of the piston 76 extends slidably into a bore 79 of the cylinder end wall 74 and into separatable engagement with the left end of the master cylinder plunger 52. Therefore when the piston 76 is forceably advanced to the right it will advance the master cylinder plunger 52 for applying the vehicle brakes. Fluid under pressure from the source 49 is admitted to the left end of the cylinder 73 behind the piston 76 under control of the control valve 48. The control valve 48 comprises a circumferential port 81 in the form of an internal groove in the piston stem 78 and respectively communicable through axial passages 82 (one being shown in Fig. 1) with the space between the left end of the piston 76 and the opposed end wall of the cylinder 73. Complemental elements of the control valve 48 are a land 83 circumscribing the valve operating element 45 and an adjacent groove 84 likewise circumscribing the element 45. An axial bore 85 in the tubular element 45 communicates with the annular groove 84 through a plurality of circumferentially spaced ports 86 of which one is shown. The valve 48 is shown in a pressure releasing position wherein fluid can exhaust from the annular chamber 80 through the passages 82, port 81 and a portion 87 of a bore 88 of the piston 76 wherein the valve control member 45 is slidably mounted. After escaping through the bore portion 87 the fluid exhausting from the chamber 80 can flow through a port 89 into the cylinder chamber 90 from which it is forceable through a fitting 91 and a conduit 92 to a sump 104 pursuant to subsequent advancement of the piston 76 and attendant contraction of the chamber 90. In Fig. 1 it can be seen that the return line fitting 91 is at higher elevation than the port 89 wherefore this port will always be immersed in the liquid to insure no entry of air into the pressure chamber 80 with attendant erratic delaying effect when liquid under pressure is introduced into the chamber 80 to cause the next brake applying stroke.

Valve operating element 45 extends axially into a bore 93 in the master cylinder plunger 52 into contact with the spring retainer cap 72. A snap ring 94 in the left end of the bore 93 cooperates with a shoulder 95 of the valve operating element to prevent withdrawal of said element from said plunger. Any brake fluid leaking past the enlarged right end 96 of the brake pedal plunger 52 is returned to the reservoir through a port 97. An oil seal in the form of an O-ring 98 prevents leakage of oil from the reservoir 56 into the tubular stem 78 where it would co-mingle with the hydraulic fluid used in the pressure booster and vice versa. This same function is also served by an O-ring 100 backed by a leather ring 100a, both disposed in a groove 100b in the plunger 52. An O-ring type of seal 99 prevents leakage of fluid from the pressure booster unit between the tubular valve operating element 45 and the bearing 101 therefor in the left end wall of the cylinder 73.

The source 49 of pressure fluid for actuating the pressure booster communicates through the conduit 51 and a fitting 102, carried by the outer end of the valve operating element 45, with the bore 85 within such element 45. The source of pressure fluid includes an engine driven pump 103 which draws fluid from the sump 104 through a conduit 105 and discharges the fluid through a conduit 106, a switching valve 107, a conduit 108, and a check valve 109 into an accumulator 111. Fluid from the sump 104 is also withdrawn through a conduit 112 by a vehicle driven pump 113 which is adapted to discharge through a conduit 114 and the switching valve 107, said conduit 108 and the check valve 109 into the accumulator 111. A pressure relief valve 115 is connected between the low pressure and high pressure conduits 105 and 106 and a similar pressure relief valve 116 is connected between the low pressure and high pressure conduits 112 and 114.

Assuming the vehicle engine is at rest and that the vehicle is coasting, only the pump 113 will be operating wherefore the pressure of fluid in the conduit 114 will prevail over that in the conduit 106 and shift a ball 117 axially of a cylindrical bore 118 in the casing 119 of the switching valve 107 into the position shown where the ball is effective to prevent discharge of fluid from the conduit 114 through a port 121 wherefor fluid from the conduit 114 will be available to replenish the fluid supply in the accumulator 49. Excess of fluid flows through the pressure relief valve 116 to the sump 104.

Assuming the vehicle to be at rest the pump 113 will be idle but if the vehicle engine is running the pump 103 will be operable to draw fluid from the sump 104 and discharge through the conduit 106 into the valve casing 119 for shifting the ball 117 into closing relation with the port 122 so the pump 103 is then effective for keeping the accumulator supplied with fluid under pressure. The excess of fluid is discharged through the pressure relief valve 115 to the inlet side of the pump or to the sump 104. The bore 118 of the valve casing 119 is axially fluted so that when both pumps 103 and 113 are operating the ball 117 may occupy any position within said bore without preventing a supply of fluid from at least one of the pumps to the accumulator 111.

*Operation of the apparatus*

The present apparatus employs an essentially conventional master cylinder unit 13 from which a column of brake operating fluid is impressed through conduits 17, 18 and 19 to the brake actuating pulsator units 21 associated with the vehicle wheels (not shown) when a master cylinder plunger 52 is moved rearwardly or to the right as viewed in Fig. 1. Such movement of the master cylinder plunger is normally primarily incurred by force derived from fluid under pressure from the source generally designated 49 in Fig. 1 and by operating the pulsator type pressure booster unit 46 under control of a brake pedal 23 Fig. 2 in contiguity with an accelerator pedal 27 in the driver's compartment 12 of a vehicle. The pressure fluid source 49 includes an accumulator 111 in which a supply of fluid is maintained under pressure by a check valve 109 when neither of two pumps 103 and 113, respectively engine driven and vehicle driven, is being operated. Either of these pumps or both thereof are operable for supplying fluid to the accumulator through the switching valve unit 107.

The drawings illustrate the apparatus in the status allowing the vehicle brakes to be released. With the control valve 48 Fig. 1 in the position shown, fluid under pressure from the accumulator 111 reaches the groove 84 of this valve through the conduit 51 and the bore 85 of the valve operating element 45 but can flow no farther. The spring 71 in the master cylinder 55 will have returned the plunger 52 to the position shown and the spring cap 72 will have pressed against the right end of the valve operating element 45 for retracting this element into the position shown. This retractive movement of the element 45 caused the circumscribing land 83 thereon to have uncovered the valve port 81 to establish communication of the pressure booster chamber 80 with the pressure booster chamber 90 through the channel 82, said port 81, opening 87 and the port 89 thus facilitating retraction of the piston 76 into the position shown under the force of the spring 77.

When it is desired to apply the brakes the operator will depress the brake pedal 23 by pivoting it counterclockwise about the fixed pivot 24 and thereby cause rearward motion of the valve operating element 45. This will first move the valve 48 into a "closed" position wherein the land 83 enters the opening 87 to prevent communication between the pressure booster chambers 80 and 90. This movement of the valve operating element 45 is yieldably opposed by the spring 71 in the master cylinder 55. Continued depression of the brake pedal and attendant rearward movement of the operating element 45 will establish registration of the valve groove 84 with the port 81. Fluid under pressure will then flow into the pressure booster chamber 80. This causes the piston 76 to move rearwardly against the force of the spring 77 and to press the right end of the tubular stem 78 against the left end of the master cylinder plunger 52. This movement of the piston 76 and of the plunger 52 will cease when the piston moves far enough to carry the port 81 out of registry with the groove 84 and into registry with the land 83. Consequently the advance of the piston 76 and plunger 52 for applying the vehicle brakes will be in an amount correlated with the manual advance of the valve operating element 45. The operator therefore responds conventionally to apply the vehicle brakes with a firmness correlated with the amount of depression of the brake pedal. Partial release of the brakes is possible by partially releasing the brake pedal to allow the valve-operating element 45 to retract under the force of the spring 71 and pressure of the fluid column in the master cylinder 55 to move the land 83 forwardly (to the left) from the opening 87 to allow exhaust of fluid from the pressure booster chamber 80 through the valve 48 into the chamber 90. This occurs attendant to retractive motion of the piston 76 by the spring 77 and the pressure of fluid in the cylinder 55 against the plunger 52 and the right end of the tubular stem 78. This retractive motion of the piston 76 will cease when the opening 87 commences to telescope over the land 83 of the partially retracted valve-operating element 45. Complete release of the brakes is attained by complete release of the brake pedal 23 so that the piston 76 completely retracts before it can carry the opening 87 telescopically over the valve land 83. Any leakage of fluid between the piston 76 and the cylinder wall 73 which would cause an excess of fluid in the pressure booster chamber 90 is accommodated by the conduit 92 which conducts the excess fluid into the common sump 104 for the pumps 103 and 113.

A pressure limiting valve unit 140 in the work member 76 allows fluid to escape through passage 141 should the source be one capable of developing pressure in excess of a predetermined value, say 30 lbs./sqare inch. This assures the pressure booster unit capability of operating without applying the vehicle brakes too suddenly irrespectively of the pressure of a standard equipment source upon a vehicle.

One advantage of the present apparatus is the feature of providing resistance to depression of the brake pedal 23 as a direct function of the actual braking force incurred by the brake shoes 22 while causing such resistance to depression of the brake pedal to be significantly less than that incurred by conventional braking systems. It can be observed in Fig. 1 that during application of the brakes with a force proportional to the pressure of the fluid column of which a portion is in the fluid column confining means 55, such pressure of the fluid column is impressed upon the right end of the valve operating element 45 to urge this element retractively. But because of the end area of the element 45 exposed to the fluid column being substantially less than the cross sectional area of the bore of the master cylinder 55 the total force exerted endwise on the element 45 by the column of brake fluid will be correspondingly less than would be necessary to advance and hold a conventional master cylinder plunger in the brake applying position. In the present apparatus the master cylinder plunger 52 is advanced by mechanical force developed in the pressure booster unit 46 while only a comparatively smaller control force manually applied endwise to the valve operating element 45 is required to prevent retraction of such element by the pressure of the brake fluid column.

The magnitude of the diminutive reactive force exerted by the fluid on the right end of the operating element 45 can be varied in accordance with the diameter of such element. However, this diminutive force will always be proportional to the force with which the brake shoes are frictionally applied to the vehicle brake drums wherefore the operator of the vehicle will have an accurate sense of the amount of braking force being applied. This is contrary to the control characteristics of a control valve corresponding to the valve 48 but adjusted solely in opposition to a spring which would cause the resistance to depression of the brake pedal to increase in direct proportion to the distance it is depressed. Such resistance of a spring would not necessarily have a magnitude correlated with the amount of braking force incurred for every position of the brake pedal.

Another advantage of the present apparatus because of the diminutive reaction force of the brake fluid upon the valve operating element 45, is the convenient and practicable use of a brake pedal requiring a smaller range of motion with reference to that required for the conventional brake pedal. Because of the relatively small force required for advancing the valve operating element 45 there needs to be correspondingly less mechanical advantage incurred by the linkage interposed between the brake pedal and the valve operating element. Consequently this linkage need not incur substantial motion diminishing action for the pedal, wherefore a relatively small movement of the pedal will be effective for controlling the valve. Consequently the motion range of the brake pedal can correspond substantially to that of the conventional accelerator pedal. This facilitates placing the brake pedal and the accelerator pedal in close proximity to provide convenience for the operator in shifting his foot selectively between these two pedals. The proximity of the brake pedal and accelerator pedal is such that an operator's foot can simultaneously depress these pedals, but the auxilliary throttle control shown in Fig. 2 is operable under control of the brake applying mechanism to close the throttle despite throttle opening tendencies of the depressed throttle pedal. As soon as the brake pedal 23 is depressed, and before it can reach to the level of the accelerator pedal 27, the attendant increased pressure in the chamber 80 is communicated to the ram 30f whereby its plunger 30e pushes the throttle lever 30d into the closed throttle position against the compressed load of spring 30 if the rod 30a has been moved to the left by depression of the accelerator pedal. This will eliminate the necessity of the driver being careful not to have his foot over the accelerator pedal when pressing the brake pedal.

As wear occurs upon the friction surfaces of the brake shoes this will be reflected conventionally to the operator by the brake pedal being depressed a correspondingly greater distance before the brakes commence to be applied. However, because of the entire operating range of the brake pedal being less than the brake pedal of conventional manually operated master cylinder units, the initial movement of the brake pedal before commencing to apply brakes with worn friction surfaces will be less and will be correspondingly less annoying to the operator, although the increased initial idle motion of the pedal will be sufficient to detect when the brake surfaces are worn enough to require replacement.

Still another advantage is the capability of the apparatus of enabling the operator to engage the brakes by manual force applied directly through the brake pedal 23. In the normal operation of the apparatus a shoulder 125 upon the valve operating element 45 is not advanced far enough to abut the left end of the master cylinder plunger 52, this being because of the valve 48 being first operated to admit pressure fluid into the master cylinder chamber 80 so that the tubular stem 78 advances the plunger 52 more rapidly than the shoulder 125 can approach said plunger. In the event of failure of the pressure fluid source 49, however, the shoulder 125 can abut the plunger 52 whereupon by pressing abnormally upon the pedal 23 the operator will be able to advance the brake fluid column for applying the brakes.

A further advantage is the employment of the accumulator 111 in the fluid pressure source so that in the event of failure of either pump to operate when it is desired to obtain power application of the brakes there will be sufficient fluid stored in this accumulator for applying the brakes a plurality of times.

A modified form of the invention shown in Figs. 3 and 4 employs a pressure booster unit 151 energized when subjected to sub-atmospheric air pressure having its source for example at an intake manifold 152 of an internal combustion engine (not shown). The engine draws air successively through a diagrammatically shown air cleaner 153 and a carburetor 154. A low pressure conduit 155 leading from the intake manifold connects with a check valve 156 which is connected by a conduit 157 with a diagrammatically illustrated accumulator 158. A flexible conduit 159 communicates between the accumulator and an axial bore 161 in a valve operating member 162 corresponding to the valve operating member 45 in the first embodiment. In this case, however, the bore in the valve operating rod is connected with the low pressure side of the fluid energy source. The high pressure side of the fluid energy source is at atmospheric pressure and communicates through a conduit 163 leading from the air cleaner 153 to a chamber section 164 at one side of a piston type work member 165 in a chamber 166 of the pressure booster unit 151. Chamber section 164 is a high pressure section whereas a section 167 at the opposite end of the piston or work member 165 is a low pressure section.

The booster unit piston 165 includes a tubular stem 168 having an enlarged end portion 169. This enlarged end portion of the work member stem 168 has a plurality of radial ports 171 communicative with the interior of such stem; see Fig. 4. An internal circumferential groove or port 172 in the enlarged end portion 169 is spaced axially from the circle of ports 171 and communicates with the chamber section 164 through a series of axial ports 173 which alternate with the radial ports 171 circumferentially of the stem as illustrated in Fig. 4.

The valve operating member 162 extends axially through the work member stem 168 and through a corresponding work member stem 174 of a piston type work member 175 in a second chamber 176 of the pressure booster unit. The most rearward end, the right end as viewed in Fig. 3, of the member 162 projects slidably into a bore 83' in a plunger 52' of a master cylinder unit 13'. This master cylinder unit 13' is essentially like the master cylinder unit 13 of the first embodiment wherefore to expedite this disclosure, all corresponding parts of this unit will be simply designated by the same respective reference characters as the Fig. 1 embodiment but with the addition of a prime.

Work member 175 divides the chamber 176 into a high pressure chamber section 177 and a low pressure chamber section 178. Work member 175 contains radial ports 171' corresponding to ports 171 and an internal groove-like port 172' corresponding to the port 172. This port 172' communicates with the high pressure chamber section 177 through axial ports 173' corresponding to the ports 173 in the stem 168.

Stem 174 is axially slidable within the cylindrical inner periphery of an annulus 179 constituting the inner element of an oil seal unit 181 held in fabricated assembly with an end wall 182 of the chamber 176 and with a flange 183 of the master cylinder unit by means of a circle of bolts 184 of which one is shown. Inasmuch as the inner periphery of the oil seal element 179 is smaller in diameter than the bore of the master cylinder 55' and is in contiguous coaxial relation therewith such inner periphery is tantamount to and therefore can be regarded as a reduced diameter portion of the master cylinder bore. In other words, the annulus 179 of the oil seal unit 181 in providing a sliding seal relation with the outer periphery with the work member stem 174 functions similarly to the bore 79 in the first embodiment and which also can be regarded as a reduced diameter portion of the bore of the master cylinder 55.

The right end of the work member stem 174 is separably abutted against the left end of the master cylinder plunger 52'. A radial flange 185 of the valve operating element is abuttable against a shoulder 186 formed internally of the hollow stem to limit retractive endwise movement of the valve operating member. This flange 185 and a large diameter land portion 187 of the valve operating member are traversed by an axial groove 188 in said member which provides a breather passage for an annular space 189 between the left end of the plunger 52' and the stem 174.

A plurality of radial ports 191 (one being shown) spaced circumferentially about the valve operating member 162 communicates between the bore 161 in this member and a circumferential groove-like port 192 which is spaced axially from a groove or recess 193 circumscribing said member 162. A rib-like land 194 separates the circumferential port from the recess 193. Elements 191', 192', 193' and 194' respectively corresponding to the just-described elements 191–194 are formed in the member 162 for cooperation with valve components 171 and 172 in the work member stem 168. An oil seal unit 195 is secured to an end wall 196 of the chamber 166 for establishing a sliding sealing relation with the outer periphery of the stem 168.

*Operation of the second embodiment*

Assuming the parts to be in the position shown in Fig. 3 and the engine (not shown) with which the intake manifold 152 is associated to be operating, a low pressure condition will be created in the intake manifold, and this will be communicated through the conduit 155, the check valve 156, conduit 157, the accumulator 158, and the flexible conduit 159 with the bore 161 of the valve operating member 162. Sub-atmospheric pressure will thereby be communicated to the circular ports 192 and 192', but without effect, inasmuch as they are sealed closed by the inner periphery of the hollow work member stems 174 and 168.

Concurrently, substantially atmospheric pressure will be communicated from the air cleaner 153 through the conduit 163 into the chamber section 164. Atmospheric pressure is also maintained in the chamber section 167 because of communication between the chambers 164 and 167 through the axial ports 173, the annular port 172, the bridging recess 193' in the valve operating member, and the radial ports 171. Atmospheric pressure is also present in the chamber sections 177 and 178, communication being had between the atmospheric pressure chamber section 164 and the chamber section 177 through one or more ports 201 in the forward or left end portion of the cylindrical wall of the chamber 166. Communication is provided between the chamber sections 177 and 178 by the axial ports 173', the annular port 172', annular bridging recess 193, and the radial ports 171'.

Inasmuch as the various sections of the work member chambers 166 and 176 are intercommunicating, the spring 71' in the master cylinder 55' can expand to press the plunger 52' forwardly or to the left, as viewed in Fig. 3, to force the work member 175 and its stem 174 forwardly into the position shown. This causes displacement of the work member 165 and its stem 168 forwardly since the stem 168 abuts against the left end of the work member 175 at 202.

When the operator wishes to apply the vehicle brakes, he will press upon a pedal corresponding to the brake pedal 23 in Fig. 2, which is connected through a linkage corresponding to that shown in Fig. 2 with the brake operating member 162, which corresponds to the brake operating member 45 in the first-described embodiment. This will cause the operating member 162 to be moved to the right, whereupon the circular lands 194 and 194' upon such member will first close the ports 171' and 171 to terminate communication between the chamber sections 178 and 177 and between the chamber sections 167 and 164. Continued advance of the member 162 to the right will simultaneously carry the annular ports or recesses 192 and 192' into registry respectively with the ports 171' and 171, whereupon a pressure differential will be simultaneously created upon the opposite ends of the work members 175 and 165, since the chamber sections 178 and 167 will then be established in communication with the source of sub-atmospheric pressure at the intake manifold 152. Therefore, the work members 175 and 165 will be caused to simultaneously advance to the right under the influence of the predominating air pressure in the chamber sections 177 and 164. The rear end of the stem 174 will thereby be caused to press against the forward end of the plunger 52' both by the force of air pressure upon the left end of the work member 175 and upon the left end of the work member 165, since the stem 168 of this latter work member will be caused to exert force upon the left end of the work member 175 at 202.

When the brakes have been applied with the desired force, the operator ceases advance of the valve-controlled member 162, whereupon the work members 175 and 165 will terminate their advancement by carrying the ports 171' and 171 into registry with the lands 194 and 194'.

Should the operator desire to apply the brakes with greater force, he will simply depress the brake pedal further to cause further advance of the control member 162, for again placing the annular ports 192 and 192' in registry with the ports 171' and 171, whereupon the work members, together with the master cylinder plunger 52' will be caused to advance an amount correlated with the increment of pedal depression and terminated when the ports 171' and 171 again arrive in registry with the lands 194 and 194'.

Partial release of the brakes is accomplished by partial retraction of the control member 162 and carrying the annular recesses 193—193' into bridging relation with the ports 172'—171' and 172—171, respectively. When this is done, communication is established between the chamber sections 178—177 and 167—164, so that the compressed fluid in the master cylinder 55' can force the master cylinder plunger 52' retractively to the left together with the work members 175 and 165, incident to air flowing from the chamber section 177 through the axial ports 173', annular port 172', bridging recess 193, and the radial ports 171'. At the same time, air flows from the chamber section 164 through the axial port 173, annular port 172, bridging recess 193' and the radial ports 171 into chamber section 167. When the master cylinder plunger and the work members 175 and 165 have been retracted a distance correlated with the manually controlled retraction of the valve control member 162, the ports 171' and 171 will arrive in registry with the lands 194 and 194' to maintain the status of partial brake engagement.

When it is desired to completely release the brakes, the operator will conventionally release the brake pedal, causing complete retraction of the valve operating member 162 into the position shown in Fig. 3, so that ensuing complete retraction of the master cylinder plunger 52' and of the work members 175 and 165 cannot retract the radial ports 171' and 171 into registry with the annular lands 194 and 194'.

During depression of the brake pedal for causing application of the brakes, there is a physical manifestation to the operator of the force being mechanically exerted upon the master cylinder plunger 52' in the same manner as explained above in the first embodiment. This pressure manifestation is transmitted to the right end of the valve-operating member 162 by the pressure of fluid in the master cylinder, and this being but a fraction of the total force exerted upon the brake cylinder fluid by the master cylinder because of the right end area of the control member 162 being less than the right end area of the plunger 52'. The ratio of this miniature force transmitted reactively from the brake fluid through the valve-operating member to the foot of the operator upon the brake pedal can be selectively predetermined in accordance with the size of the bore 93' in the plunger 52', with respect to the bore of the master cylinder.

Should the source of sub-atmospheric air pressure fail, it is possible for the operator to manually advance the master cylinder plunger 52' for engaging the brakes. This can occur by the annular flange 185 on the valve-operating member being advanced into engagement with the left end of the plunger 52', whereupon continued depression of the brake pedal will cause the member 162 and the plunger 52' to advance in concert for compressing the fluid in the hydraulic brake system. During this concert advance of the operating member 162 and the master cylinder plunger, there is no impediment to such movement by either of the work members 175 or 165, inasmuch as the breather passage 188 provides communication between atmospheric pressure in the air cleaner 153 and the annular space 189, which is expanded pursuant to advance of the master cylinder plunger from the rear end of the work member stem 174.

Having described a limited number of embodiments of the invention with the view of concisely illustrating the same, but without intention of limiting the scope of the invention to less than the boundary imposed by the prior art, I claim:

1. In a braking and throttle control system for a vehicle having brakes and driven by an engine of which the power output is controlled by a throttle; a throttle control pedal operably connected with said throttle and having a foot pad depressible for normally opening the throttle to increase the engine power output; a brake control pedal having a foot pad, said pedals having release positions wherein said pads are substantially in a common plane and being disposed sufficiently contiguous that an operator's foot can engage them both for simultaneous depression; a source of liquid under pressure; a hydraulic pressure booster comprising a chamber and a work member subjected to the pressure of fluid in such chamber and advanceable thereby when the chamber is communicative with said source; means including a valve adapted to establish communication between said source and said chamber; force transmitting means interposed between said work member and the vehicle brakes for applying thereto an operating force in accordance with the amount of advancement of said work member; means yieldably urging the valve into a neutral position wherein it precludes communication between said chamber and said source; a manually advanceable member connected with said valve and operable when advanced for opening the valve to establish communication between said chamber and said source, said work member being advanceable relatively to said manually advanceable member responsively to such communication to replace the valve into said neutral position incident to advancing a distance correlated with the distance of advancement of the manually advanceable member; means for applying to said manually advanceable member a diminutive retractive force proportional to the operative force applied to the brakes by said work member; means connecting the brake pedal with said manually advanceable valve operating member to advance the same pursuant to depression of such brake pedal; and means operable responsively to an increase of pressure in said chamber to a value less than that required for advancing the work member to prevail over said accelerator pedal for closing the throttle.

2. The combination set forth in claim 1 wherein the means operable responsively to an increase of pressure in the pressure booster chamber comprises a hydraulic ram including a plunger disposed for closing the throttle when the ram is subjected to fluid under pressure, and a conduit communicating between said ram and said chamber.

3. The combination set forth in claim 1 wherein the operating means interconnecting the brake pedal and said manually advanceable valve operating member possess motion diminishing characteristics not substantially diminishing the motion imparted to said member relatively to the motion of the foot pedal pad.

4. In a braking system for hydraulically operated brakes, a master cylinder, an axially bored plunger advanceable axially in said cylinder to compress fluid therein to effect brake operating energization of such cylinder and plunger, a pressure booster unit comprising an axially bored work member advanceable axially against the plunger to advance the same pursuant to energization of the booster unit during admittance of energizing fluid thereinto, valve means manipulatable to admit fluid into the booster unit, a valve operating element projecting axially through the work member bore into the plunger bore and advanceable therein to manipulate the valve means into position for accommodating said admittance of energizing fluid into the pressure booster unit, said valve operating element being subject to the pressure of fluid in the master cylinder and urged retractively thereby and being movable in each of said bores within a range of valve-operating movement relatively to the work member, and means for causing the master cylinder plunger to be axially advanced by and with said valve operating element independently of movemetnt of the work member pursuant to advance of said element beyond the valve-operating range should the pressure booster fail to energize.

5. The combination set forth in claim 4, wherein an end portion of the valve operating element projecting into the plunger bore and of less transverse area than the transverse area of the plunger is exposed to the brake-operating fluid and thus adapted to be urged retractively thereby for manifesting to the operator the magnitude of brake-operating force exerted by the master cylinder.

6. In a braking system for fluid operated brakes, fluid column confining means including a master cylinder and an axially bored plunger axially advanceable in such cylinder to compress such fluid column to a brake-applying pressure, a source of fluid at non-atmospheric pressure, a pressure booster unit comprising an axially bored work member separable from the master cylinder plunger but axially advanceable into force transmitting relation with respect thereto to advance the same attendant to energization of the booster unit pursuant to communication thereof with said source, valve means manipulatable to establish communication between the booster unit and said source, said valve means including a first component constrained for movement with said work member and a manually controlled component, a valve-operating element projecting through the work member bore into the plunger bore where an end portion of less transverse area than the plunger is exposed to the interior of the fluid column confining means, said valve-operating element being movable axially in said bores, the manually controlled component of the valve means being constrained for movement with said control element to cooperate with the first component in establishing said communication when the control element is advanced, in terminating such communication pursuant to consequent advance of the one valve component with the work member, and in deenergizing the booster unit incident to subsequent retraction of the control element and the other component therewith and means for imparting axial movement from the valve-operating element to the master cylinder plunger to advance the same independently of the booster unit work member in the event of failure of the non-atmospheric pressure source.

7. In a braking system for fluid operated brakes, a master cylinder having a principal bore and a coaxial reduced diameter bore portion at an end thereof, an axially bored plunger advanceable axially in the principal bore of such cylinder to effect brake operating movement, a pressure booster unit comprising a member including a hollow stem projecting into the reduced diameter bore portion of the cylinder and advanceable endwise against the plunger to advance the same pursuant to energization of the booster unit during subjection thereof to a fluid pressure differential, said work member being traversed by a bore extending axially through the stem thereof, valve means manipulatable to subject the booster unit to fluid pressure differential, a valve-operating element projecting axially through the work member and into the plunger bore and advanceable thereinto relatively to the work member to manipulate the valve means into position for subjecting the pressure booster unit to said pressure differential, said valve-operating element being freely movable relatively to said plunger within a range of movement adapting it to manipulate the valve as aforesaid, means for constraining said plunger to be advanced with said valve-operating element attendant to further advance thereof beyond the valve-operating range, incident to axially separating the plunger from the work member and creating a space therebetween, and breather passage means communicative with such space for accommodating expansion thereof and thereby diminishing the force necessary to cause advance of the plunger relatively to the work member and with the valve-operating element beyond the valve-operating range.

8. In a fluid braking system, a master cylinder having a bore, means providing a smaller diameter stem-receiving bore communicating axially into an end of the cylinder bore, an axially bored plunger in the cylinder bore, a pressure booster unit comprising a fluid receiving chamber disposed adjacently to said end of the cylinder in axial registry with said bores, a work member axially advanceable in said chamber toward the cylinder and alternately retractible, said work member dividing the chamber into a relatively low pressure section on the side thereof facing the master cylinder and into a relatively high pressure section on the opposite side of such member, said work member including an open-ended hollow stem projecting axially through the stem-receiving bore into force transmitting relation with said plunger for axially advancing the same pursuant to advance of the work member, said stem containing axially spaced ports communicating between the interior thereof and respective of said chamber sections, a valve-operating member extending axially through the work member bore into the plunger bore for relative axial movement therein, said member containing an axial channel together with a port leading radially from such channel and a recess spaced axially from such port, said recess bridging the stem ports to provide communication between the chamber sections when the operating member is retracted, and the port in said member being placed in communicative registry with one of said stem ports when said member is advanced relatively to the work member, and the channel being adapted for communicative connection with a source of fluid at a pressure differing from that in the chamber section communicated with by the other stem port to create a pressure differential across the work member for advancing the same when the valve-operating member is so advanced.

9. In a braking system for hydraulically operated brakes; a master cylinder; an axially bored plunger in said cylinder; a pressure booster unit comprising axially registered chambers in axial registry with the master cylinder, and coaxially bored work members respectively in and dividing said chambers into sections, each work member being advanceable axially in its chamber and of the master cylinder in response to energization of the unit by the creation of a pressure differential in the sections of each chamber, each of said advancing work members being adapted to impart an advancing force to the master cylinder plunger to cause concert advance of said members and plunger, the bores of the work members being coaxial with the plunger bore; a valve operating member having an axial bore through which fluid at energizing pressure is communicatable with a section of each chamber, said operating member projecting slidably through the work member bores into the bore of said plunger; sets of valve ports respectively in said work members and the ports in each set being spaced axially in the operating member bore and respectively communicating with the sections of their associated chamber; valve port means in portions of the operating member slidable in the work members and communicating with the bore of such member, said valve port means being placed simultaneously in registry with one port of each set of ports to create the pressure differential in each chamber pursuant to predetermined advance of the operating member, said operating member being further advanceable relatively to the work members to forcibly advance the plunger in the event of no energizing pressure in the operating member bore; and means for deenergizing said unit comprising means on the operating member to establish communication through the ports in each set between the sections of each chamber pursuant to subsequent retraction of the control member.

10. In a braking and throttle control system for a vehicle having brakes and driven by an engine of which the power output is controlled by a throttle; a throttle control pedal operably connected with said throttle and having a foot pad depressible for normally opening the throttle to increase the engine power output; a brake control pedal having a foot pad, said pedals having release positions wherein said pads are substantially in a common plane and disposed contiguously for simultaneous engagement and depression by one foot of an operator; a power operated brake applying unit in control of said brakes with a braking intensity correlated with the degree of energization of said unit; means under control of said brake pedal for energizing said brake applying unit according to the degree of depression of the brake pedal pad and operable to fully energize said unit attendant to depression of the brake pedal pad a distance unexceeded by the operating range of movement of the accelerator pedal pad; and means operable responsively to partial energization of said brake applying unit to prevail over said accelerator pedal for closing the throttle in the event of said pedal pads being simultaneously depressed.

OSCAR H. BANKER.

References Cited in the file of this patent

UNITED STATES PATENTS

| Number | Name | Date |
|---|---|---|
| 1,781,869 | Bragg et al. | Nov. 18, 1930 |
| 1,919,930 | Cash | July 25, 1933 |
| 2,006,487 | Sorensen | July 2, 1935 |
| 2,090,152 | Porter | Aug. 17, 1937 |
| 2,109,101 | Clarke | Feb. 22, 1938 |
| 2,130,799 | Hofstetter | Sept. 20, 1938 |
| 2,183,354 | Lange | Dec. 12, 1939 |
| 2,230,742 | Bush | Feb. 4, 1941 |
| 2,245,852 | Castle | June 17, 1941 |
| 2,260,491 | Stelzer | Oct. 28, 1941 |
| 2,265,817 | Rockwell | Dec. 9, 1941 |
| 2,284,380 | Drabble | May 26, 1942 |
| 2,328,684 | Schnell | Sept. 7, 1943 |
| 2,338,244 | Hayes | Jan. 4, 1944 |
| 2,360,578 | Porter | Oct. 17, 1944 |
| 2,374,545 | Ingres | Apr. 24, 1945 |
| 2,443,642 | Rockwell | June 22, 1948 |
| 2,470,748 | Thomas | May 17, 1949 |
| 2,475,105 | Mitton | July 5, 1949 |